Patented May 25, 1948

2,442,076

UNITED STATES PATENT OFFICE 2,442,076

PROCESS FOR BREAKING PETROLEUM EMULSIONS

Melvin De Groote, University City, and Arthur F. Wirtel, Glendale, Mo., assignors to Petrolite Corporation, Ltd., Wilmington, Del., a corporation of Delaware No Drawing. Application July 13, 1945, Serial No. 604,999

10 Claims. (Cl. 252—341)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts, from pipeline oil.

And still another object of our invention is to provide a new demulsifier for petroleum emulsions of the water-in-oil type.

Demulsification, as contemplated in the present application, includes the preventive step of commingling the demulsifier with the aqueous component which would or might subsequently become either phase of the emulsion in absence of such precautionary measure. Similarly, such demulsifier may be mixed with the hydrocarbon component.

In our co-pending application of this same date, Serial No. 604,993, filed July 13, 1945, we have disclosed a new composition of matter useful for various purposes, and particularly for demulsification, which is described in the following language:

"An acidic partial ester containing (a) at least one polyhydric alcohol radical, (b) at least one diglycollic acid radical, and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical."

In said aforementioned application we pointed out that there might be present in any monomer or in the structural unit of any polymer a plurality of unreacted carboxyl radicals, and that if desired, and particularly if one were interested in changing the solubility, such carboxyl radicals could be converted into an ester form which either would increase oil solubility or water solubility, but in any event, it was preferred that there be present at least one free uncombined, i. e., one unesterified carboxyl radical.

The present application is concerned with a variant or sub-genus of our aforementioned co-pending application, in that the partial esters containing one or more free carboxyl radicals per monomer, or per structural unit in the case of polymers, are reacted with a basic hydroxylated tertiary amine, which may be either a monoamine or a polyamine, so as to produce an amino ester of the hereinafter described composition.

It is convenient, or at least desirable, to obtain the herein described products by reaction between the partial acidic esters aforementioned and a hydroxylated tertiary amine in which all of the amino nitrogen atoms, in the case of a polyamine, are tertiary. It appears most expedient to substantially repeat what has been said in our co-pending application as to the preparation of the partial acidic esters.

Thus, one type of reactant, i. e., the partial acidic ester contemplated for reaction to produce the resultant which is contemplated as a demulsifier, consists of an ester containing a polyhydric alcohol radical, a diglycollic acid radical, and a plurality of acyloxy radicals:

derived from any detergent-forming monocarboxy acid having 8 to 32 carbon atoms, with the proviso that at least one acyl radical is derived from a hydroxylated detergent-forming monocarboxy acid having 8 to 32 carbon atoms, each of the hydroxyls of each polyhydric alcohol being esterified with a group containing at least one of said acyloxy radicals, the number of said groups esterified with polyhydric alcohol hydroxyls being as great as the total number of said polyhydric alcohol hydroxyls. In other words, the number of the groups comprising an acyloxy radical derived from a detergent-forming monocarboxy acid that are ester-linked to each polyhydric alcohol radical, is in each instance equal to the valency of the polyhydric alcohol radical, so that in the ester product each polyhydric alcohol radical is free from any uncombined hydroxyl radical directly attached thereto, and the number of such groups ester-linked to each polyhydric alcohol residue is additional to the number of such groups ester-linked to any other polyhydric alcohol residue contained in the ester.

Detergent-forming monocarboxy acids are those acids having at least 8 carbon atoms which have the capacity to react with alkali to form soap or soap-like products, and are exemplified by fatty acids containing 8 to 32 carbon atoms, such as oleic, linoleic, ricinoleic, stearic, hydroxystearic, palmitic, linolenic, erucic, clupanodonic myristic, etc., and fatty acids of the character referred to are normally regarded as preferable. The term "detergent-forming" carboxy acid includes naphthenic acids. Naphthenic acids are derived from various petroleums or are obtained by treatments which involve oxidation of hydrocarbon bodies present in the naturally-occurring crude oils. The number of carbon atoms in naturally-occurring naphthenic acids may vary from 10 carbon atoms to 32 or even 38 carbon atoms. Naphthenic acid or admixtures of the type available on the open market, and which preferably have a saponification value in the neighborhood of about 250, are suitable. Naphthenic acids of the kind referred to are readily esterified with glycerol to form naphthenin by intimate admixture and agitation in the presence of dried hydrochloric acid gas, using a procedure that is substantially the same as that usually used in the formation or stearin from stearic acid and glycerol. It is known that such naphthenic acids can be treated, for example, with halogens so as to produce derivatives such as chloronaphthenic acids. Also included among the detergent-forming acids are those monocarboxy acids sometimes called wax acids or paraffin acids, which are formed, as a result of oxidation of paraffin or petroleum waxes, particularly those derived from paraffin base hydrocarbons, and which include hydroxylated, as well as non-hydroxylated, acids. Acids occurring in certain waxes such as carnaubic acid, cerotic acid, lanopalmic acid and lanoceric acid, are considered detergent-forming monocarboxy acids. Rosin and resinic acids, such as abietic acid, are likewise included. Such acid materials, due to the fact that they react with alkalis to form soap or soap-like products, are commonly called detergent-forming acids.

The terms "hydroxylated detergent-forming acids" or "hydroxy detergent-forming acids." refer to those detergent-forming acids which contain in the acyl radical thereof, an hydroxyl or the equivalent. The most common types of hydroxylated detergent-forming carboxy acids are hydroxylated fatty acids containing 8 to 32 carbon atoms, such as ricinoleic acid, monohydroxy and dihydroxystearic acid, trihydroxypalmitic acid, etc. Ester products adapted for use as raw materials in this invention, contain at least one radical of an hydroxylated detergent-forming acid, and preferably, such radical is a radical of an hydroxylated fatty acid containing 8 to 32 carbon atoms. In addition, hydroxylated detergent-forming acids, such as hydroxylated wax acids may be used.

While the terms "detergent-forming monocarboxy acid" and "hydroxylated detergent-forming monocarboxy acid" include oxidized acids, as well as acids in their naturally-occurring state, those fatty bodies which are drastically oxidized, have distinctive properties and characteristics and certain ester products containing such drastically-oxidized bodies are particularly effective for use as demulsifiers in the present process.

A preferred ester derivative exemplifying one class of the herein contemplated reactants, and especially suitable for the manufacture of those products intended for breaking oil field emulsions, may be obtained by esterification reaction between triricinolein and diglycollic acid. Ricinoleic acid may be indicated by the following formula:

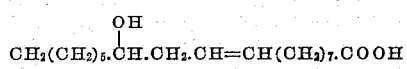

which may be regarded as coming within the more generic formula

OHRCOOH wherein OHRCOO is representative of the acyloxy group of any hydroxylated detergent-forming carboxy acid. If OHRCOO is the acyloxy group of ricinoleic acid, triricinolein may be represented by the formula

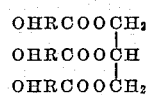

and contains the residue of the polyhydric alcohol glycerol which may be represented as

Triricinolein readily esterifies with diglycollic acid, and if three moles of diglycollic are caused to react with one mole of triricinolein, an ester product will be obtained according to the following reaction:

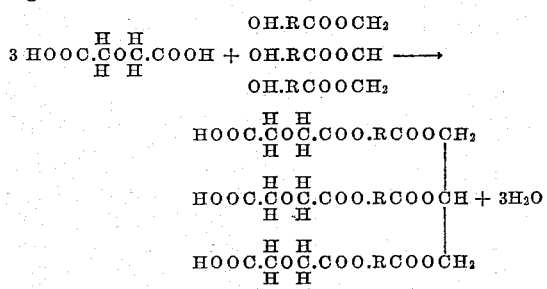

As previously suggested, the foregoing product of esterification is a particularly preferred reactant for use in the manufacture of material for breaking oil field emulsions in the practice of this invention. In the above product it is to be noted that each hydroxyl of the polyhydric alcohol (glycerol) is esterified with a group containing an acyloxy radical derived from ricinoleic acid. In the present application only those compounds are contemplated wherein each hydroxyl of each polyhydric alcohol is esterified with a group containing an acyloxy radical derived from a detergent-forming monocarboxy acid having 8 to 32 carbon atoms. It is not necessary that each of the hydroxyls contained in the acyloxy radical be esterified, although this is a characteristic of the preferred compounds contemplated herein for use as reactants. For example, the hydroxyl in only one or two of the ricinoleic residues may be replaced by glycollic acid residue.

In carrying on the esterification reaction, it is not essential that a carboxylic group of the diglycollic acid react with the alcoholiform hydroxyl in the acyloxy radical of an hydroxylated detergent-forming acid body while the acyloxy radical of the detergent-forming carboxy acid remains directly connected with the polyhydric alcohol radical. Thus, in the esterification reaction above mentioned, there may be some molecular rearrangement with the production of a compound which may be represented by the following formula:

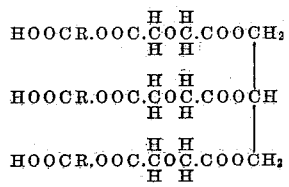

The compound above represented is likewise suitable for use as a reactant in the manufacture of reagents for employment in breaking petroleum emulsions in the practice of this invention. It is to be noted that in this compound also there is the characteristic occurrence of a group containing at least one acyloxy radical derived from a detergent-forming carboxy acid esterified with each hydroxyl of a polyhydric alcohol. In this particular example the group containing the acyloxy radical (RCOO) that is esterified with the hydroxyls of the polyhydric alcohol, is the group

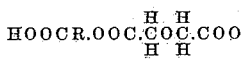

The compounds covered herein do not include compounds such as

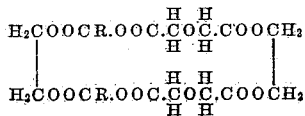

wherein the number of groups containing an acyloxy radical derived from a detergent-forming monocarboxy acid and esterified with hydroxyls of each polyhydric alcohol (two glycol residues in the example above given) is less than the total number of polyhydric alcohol hydroxyls. In the example given there is a total of four polyhydric alcohol hydroxyls and only two groups containing an acyloxy radical derived from a detergent-forming monocarboxy acid esterified therewith.

While the modifications wherein the acyloxy radical derived from the detergent-forming carboxy acid remains directly connected to the polyhydric alcohol residue is normally preponderant and is normally preferred, the other modifications wherein one or more of the diglycollic acid radicals becomes directly attached to the polyhydric alcohol radical are suitable.

In the foregoing and in subsequent formulae, a conventional showing in two dimensional form is resorted to, and no attempt other than this is made to indicate actual space molecular formulae. Moreover, distinctions between isomeric forms are to be disregarded.

As a further example of the preparation of one type of reactant herein employed, glycollic acid may be reacted with an hydroxylated partial ester, wherein each of the hydroxyls of glycol is replaced by a residue of hydroxystearic acid or ricinoleic acid, the reaction being as follows:

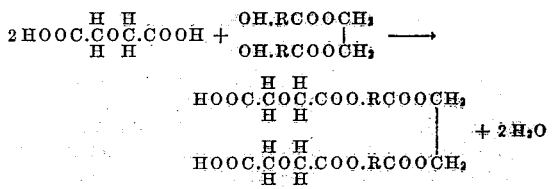

It is also possible that during the esterification there may be only partial molecular rearrangement, so that in the resulting product one acyloxy radical of a detergent-forming monocarboxy acid may be directly linked to the polyhydric alcohol radical and another acyloxy radical of a detergent-forming monocarboxy acid may be directly linked to a diglycollic acid radical, which, in turn, may be directly linked to the polyhydric alcohol radical. Thus, in the foregoing reaction involving glycol, a reaction product may be formed corresponding with the formula:

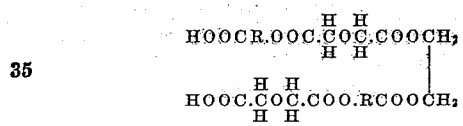

and such compounds are also suitable for use in the preparation of reagents for breaking oil field emulsions according to this invention.

It is not essential that each of the acyloxy radicals derived from a detergent-forming acid that is present in the ester product for each of the hydroxyl groups of the parent polyhydric alcohol, be hydroxylated, so long as at least one of the acyloxy radicals is hydroxylated, and thereby affords in the partial ester at least one hydroxy or ester-forming group for esterification with a carboxyl of diglycollic acid. For example, a suitable partial ester for reaction with diglycollic acid may be a mixed ester such as

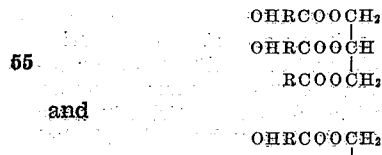

and

wherein OHRCOO is an hydroxylated acyloxy radical derived from an hydroxylated detergent-forming acid, such as ricinoleic acid, hydroxystearic acid, or the like, and wherein RCOO is an acyloxy group derived from a non-hydroxylated detergent-forming acid, such as oleic acid, palmitic acid, stearic acid, abietic acid, etc. Hydroxylated esters of the mixed type, such as those exemplified above will readily react with diglycollic acid to form an ester product suitable for breaking oil field emulsions.

A wide variety of polyhydric alcohols may be employed both of the ether and non-ether types. The following are illustrative of partial esters which are derived from polyhydric alcohols of the ether type, and which are suitable for reaction with diglycollic acid:

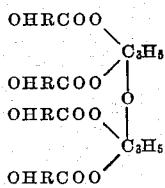

Diglycerol tetraricinoleate

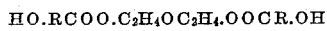

Diethylene glycol diricinoleate

Examples of other polyhydric alcohols from which suitable ester products may be derived, are triglycerol, triethyleneglycol, dipropylene glycol, alpha beta gamma butane, triol, betamethyl glycol glycerol ether, 1,3-propane diol, isobutylene glycol, monoethylene glycol ether, mannitol, sorbitol, sorbitol monobutyl ether, erythritol, adonitol, sorbitan, mannitan, etc.

As mentioned above, it is preferable to carry on the esterification reaction, so that at least one carboxyl group remains for each polybasic carboxylic acid residue. However, thus products are suitable that are produced by reaction, such that each of the carboxyl groups of the polybasic carboxy acid reacts with an alcoholiform hydroxyl. Thus, if a molecular quantity of triricinolein is heated to approximately 180° C., or higher, with one molecular quantity of glycollic acid, the reaction product may ultimately involve two of the hydroxyls of the triricinolein, with loss of water, as indicated in the following formula:

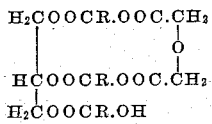

It is normally preferable, however, to control the esterification reaction, so that there is at least one free carboxyl group present in the ultimate ester product. This can be accomplished by avoiding an excessively high temperature or prolonged periods of reaction. The preferred product containing at least one free carboxyl group per molecule is the product that is most readily prepared in commercial production.

In carrying on the esterification reaction, there may develop cross linkages, either through the polyhydric alcohols, or through the diglycollic acid, due to the polyfunctionality of these materials. For example, in an esterification reaction between triricinolein and diglycollic acid, the resulting product may comprise more complex molecules, such as the following, which illustrate cross linkage through the polyhydric alcohol residue:

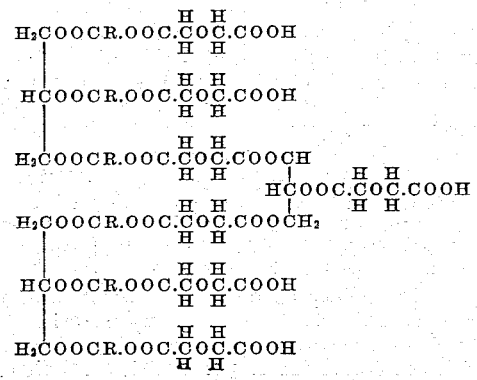

Cross linkage likewise may occur through the diglycollic acid to afford molecular structures, such as:

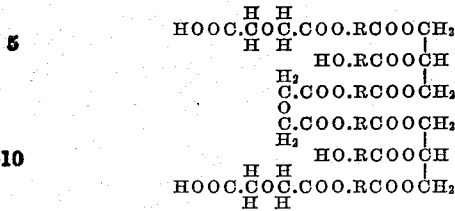

It is apparent that other cross linkages may occur. Such ester products containing more complex molecules are also suitable. It is also apparent that there may be great variations in the molecular weight of the product. The molecular weight of the ester product, as determined by cryoscopic methods, or from obvious composition of the ester, usually runs between about 300 and about 4,000 and is seldom over 6,000. Ester products having a molecular weight over about 10,000 preferably are not employed. During the esterification reaction there may be some polymerization and polymerized products, as well as simple monomers, that may be used.

In the ester product, the presence of a residual hydroxyl group is largely immaterial, provided the residual hydroxyl is not directly attached to a polyhydric alcohol residue. Any such residual hydroxyl group may be left as such, or, if desired, reacted either with additional diglycollic acid, or with any monobasic detergent-forming carboxy acid. Alternatively, any such residual hydroxyl may be acylated with monocarboxy acids containing less than 8 carbon atoms. The ester product covered herein may include such simple acylated derivatives; but the finished product must contain at least one acyloxy radical derived from a detergent-forming monobasic carboxy acid having at least 8 carbon atoms in a group that is esterified with each hydroxyl group of each parent polyhydric alcohol. Referring to any residual carboxyl group or groups, it is preferable that such group or groups be left as such.

An acidic carboxylic hydrogen atom may also be replaced by reaction with an alcoholiform hydroxyl of an hydroxylated acid. The acidic hydrogen atom may also be replaced by a residue of a monohydric alcohol, e. g., aliphatic alcohols, such as methyl, ethyl, propyl, hexyl, octyl, decyl, cetyl, ceryl, etc.; alicyclic alcohols, such as cyclohexanol and the like; or aralkyl alcohols, such as benzyl alcohol, naphthyl ethyl alcohol and the like. Similarly, the acid hydrogen may be replaced by reaction with an ether alcohol, such as those derived by reacting any of the foregoing alcohols with an alkylene oxide such as ethylene oxide, propylene oxide, butylene oxide, or the like (but excluding compounds such as glycide or the like), typical ether alcohols of the kind mentioned being illustrated by the following formulae:

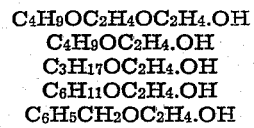

By reacting hydroxyaromatic compounds, such as phenol, naphthol and the like with an alkylene oxide, such compounds can be converted to monohydroxy aralkyl ethers which are suitable and such compounds, together with alkyl, alicyclic and aralkyl alcohols and alcohol ethers, are regarded as alkyl alcohols and as comprising an alkyl group as the term "alkyl" is used herein. As aforesaid, aryl groups are not regarded as included in the term "alkyl" (although aralkyl groups are included). A polyhydric alcohol residue may be present in a group which replaces the acid hydrogen atom of the carboxyl group, provided each hydroxyl of the alcohol is esterified with a group containing at least one acyloxy group of a detergent-forming carboxy acid having at least 8 carbon atoms. When reference is made to an ester product containing a free carboxyl group, it is intended that the product contain a COOH group, in which the acidic hydrogen atom has not been replaced. The herein described products containing a carboxylic group, are intended to contemplate the acid as such, or in the form of an ester, as mentioned hereinabove. Since, however, products containing a free carboxyl are normally preferred, the additional expense of esterifying the acidic hydrogen atom of a free carboxyl usually is not justified, or in any event, is employed in connection with part of the carboxyl radicals only.

While reference has been made herein above to various detergent-forming monocarboxy acids, it is apparent that simple derivatives, such as the halogenated compounds are functional equivalents. For example, chlorinated ricinoleic acid or chlorinated triricinolein may be employed instead of ricinoleic acid or triricinolein. Brominated oleic acid may be used instead of oleic acid. Likewise, hydrogenated abietic acid may be used instead of abietic acid. In such cases the monobasic detergent-forming carboxy material, notwithstanding modifications of the kind indicated, still has the same functional properties as the unmodified material, and thus acts in the same manner, as far as esterification reactions of the character herein described are concerned. It is also possible, for example, to condense two moles of ricinoleic acid and produce one mole of monobasic diricinoleic acid. Likewise, monobasic triricinoleic acid and monobasic tetraricinoleic acid may be used. Also the condensation product of a substance such as ricinoleic acid or hydroxystearic acid with some low molal hydroxy acid, such as lactic acid, may be used. It is to be understood that the term "detergent-forming monobasic carboxy acid" includes such functional equivalents.

Generally speaking, the majority of the esters herein above described are substantially water-insoluble, i. e., are not soluble in 1 part to 1,000 parts of water at 50°C. Water solubility can be increased by obvious variants, and may be illustrated by reference to compounds derived from ethylene glycol, such as the following:

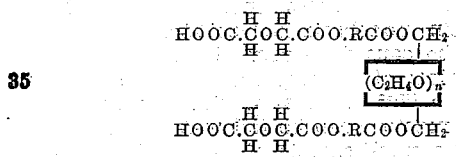

Naturally, if ethylene glycol is replaced by diethylene glycol, water solubility is enhanced. This is also true if triethylene glycol, tetraethylene glycol, or some higher homolog in the series is employed. Similarly, some other polyhydric alcohol, such as, for example, glycerol, diglycerol, sorbitol, sorbitan, pentaerythritol, or the like, can be treated with an alkylene oxide, such as ethylene oxide, propylene oxide, butylene oxide, or the like, to produce ether alcohols, or more specifically, etherified diols or etherified triols, in which the ether linkage occurs one time, or perhaps several times, at each original hydroxyl position. Thus, following such procedure, one may obtain compounds which are actually water-soluble.

In a broader sense, then, the final compounds herein contemplated and exemplifying the new compositions, may be oil-soluble, or oil-insoluble; they may be water-soluble or water-insoluble, and may, in fact, show little or no solubility in either oil or water. This latter statement is something of a paradox, but it is to be emphasized that these esters are frequently effective at enormous dilutions when used as demulsifiers for water-in-oil emulsions. For instance, we have repeatedly conducted experimental tests, in which the ratios employed vary from 1 part of demulsifier to 10,000, and at times, up to 50,000 parts of emulsion. For practical purposes, when a compound is soluble in less than 1 part to 10,000, it is commonly referred to as "insoluble," but in such extremely dilute range, the word "insoluble" is purely relative, and perhaps meaningless.

As an example of enhanced water solubility, one need only replace ethyleneglycol with nonaethylene glycol, or some higher homolog, such as examples when $n$ in the following formula represents values from 7 to 15. Compare this formula with its previous derivation involving ricinoleic acid ester of ethylene glycol.

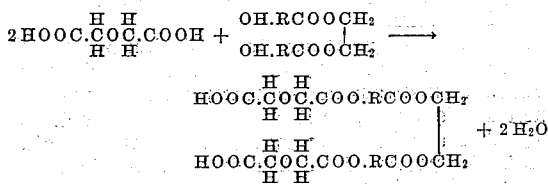

Nonaethylene glycol hexaricinoleate, a product which is commercially available, is of distinct utility when converted into acidic diglycollic acid esters.

In the preparation of esterification products, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent such as xylene, which may be removed upon the completion of the reaction. When water is formed as a reaction product, the esterification reaction may be conducted under a reflux condenser using a water trap to remove water as it is formed. The reaction can also be hastened by passing through the reaction materials a dried inert gas, such as nitrogen or $CO_2$. A catalyst, such as toluene sulfonic acid, may be added. Generally speaking, however, the reactions take place rapidly, quickly and completely by simply heating substances to enter into the reaction in desired stoichiometric proportions at a temperature above the boiling point of water, usually between about 110° and 160° C., provided there is no decomposition. The most desirable products are obtained by combinations in which the ratio of moles of diglycollic acid to moles of particular material reacting therewith is within the ratios of 1 to 3 and 3 to 1.

Esterification reactions of the kind contemplated are used for the production of a wide variety of esters, resinous materials, sub-resinous materials, and include plasticizers. Attention is directed to the following patents which are a cross-section of conventional esterification procedure which can be applied in any instance to the production of the herein contemplated esters.

British Patent No. 422,845, Jan. 14, 1935
British Patent to Eckey, No. 500,765, Feb. 15, 1939
U. S. Patent to—
    Malm, No. 2,170,030, Aug. 22, 1939
    Bradley, No. 2,166,542, July 18, 1939
    Barrett, No. 2,142,989, Jan. 10, 1939
    Frazier, No. 2,075,107, Mar. 30, 1937
    Sly, No. 2,073,031, Mar. 9, 1937
    Bradley, No. 1,951,593, Mar. 20, 1934
    Lawson, No. 1,909,196, May 16, 1933
    Kessler, No. 1,714,173, May 21, 1929
    Van Schaack, No. 1,706,639, Mar. 26, 1929
    Jones, No. 2,264,759, Dec. 2, 1941
    Wietzel, No. 1,732,392, Oct. 22, 1929
    Groves et al., No. 1,993,738, Mar. 12, 1935

Attention is directed to a comprehensive article entitled "Polyhydric alcohol esters of fatty acids, their preparation, properties, and uses," by H. A. Goldsmith, in Chemical Reviews, volume 33, December 1943, No. 3.

CARBOXYLIC REACTANT

Example 1

One pound mole of triricinolein (in the form of castor oil, which ordinarily contains approximately 85% to 90% triricinolein) is reacted with one pound mole of diglycollic acid to produce a mixture of acid diglycollates consisting essentially of triricinolein monobasic diglycollate. The reaction may be caused to occur by heating the mixed materials at a temperature of approximately 140° to 170° C. for approximately 6 to 12 hours. The reaction can be followed roughly by withdrawing a small sample of the partially reacted mass and permitting it to cool on a watch crystal. When the reaction has been completed, no crystals of diglycollic acid appear. When the sample no longer shows the presence of such crystals on cooling, it can be titrated with a standard volumetric alkaline solution, so as to indicate that the acidity which remains and which obviously is due entirely to carboxylic hydrogen and not to any unreacted diglycollic acid.

CARBOXYLIC REACTANT

Example 2

The same procedure is followed as in Example 1, except that one uses 2 pound moles of diglycollic acid instead of 1 pound mole.

CARBOXYLIC REACTANT

Example 3

The same procedure is followed as in Example 1, preceding, except that 2½ to 2¾ pound moles of diglycollic acid are used for each pound mole of triricinolein.

CARBOXYLIC REACTANT

Example 4

The same procedure is followed as in the preceding three examples, except that a temperature of approximately 150° to 170° C. is employed.

CARBOXYLIC REACTANT

Example 5

The same procedure is followed as in Examples 1 to 3, preceding, except that a temperature of 180° to 200° C. is employed.

CARBOXYLIC REACTANT

Example 6

The neutral ester derived from ricinoleic acid and pentaerythritol is substituted for triricinolein in previous Examples 1 to 4, inclusive, and the ratio of diglycollic acid is changed so as to correspond to 1 pound mole, 2 pound moles, 3 pound moles, and 3½ pound moles for each pound mole of pentaerythritol tetraricinoleate.

CARBOXYLIC REACTANT

Example 7

The neutral ester derived from ricinoleic acid and ethylene glycol, i. e., ethylene glycol diricinoleate, is substituted for triricinolein, in preceding Examples 1 to 5, inclusive, except that the ratio of diglycollic acid is changed to correspond to 1 and also to 1½ pound moles of dicarboxy acid for each mole of ethylene glycol diricinoleate.

CARBOXYLIC REACTANT

Example 8

The same procedure is followed as in Example 7, preceding, except that glycols which enhance the hydrophile property, are employed, as for example, diethylene glycol diricinoleate, triethylene glycol diricinoleate, tetraethylene glycol diricinoleate, hexaethylene glycol diricinoleate and nonaethylene glycol diricinoleate.

It is to be noted that similar compounds are readily derivable from the use of either hydroxystearic acid, for example, or a polyricinoleic acid, such as diricinoleic acid or triricinoleic acid instead of the ordinary ricinoleic acid, which is monoricinoleic.

As specific examples of chemical compounds typifying the preferred reactancts herein employed, one may point out that the following appear as constituents of one or more of the previous examples, to wit: Triricinolein monodiglycollate, triricinolein di-diglycollate, triricinolein tri-digycollate.

The esterification products, according to Examples 1 to 8, are viscous, yellowish materials resembling somewhat blown castor oil in consistency. They are only slightly soluble in either water or in paraffin base mineral oil (not more than 1 part to 100), but go into solution with lower alcohols (methyl to octyl) to form a clear solution.

Mixed glycerides, or the equivalent esters, obtained from other polyhydroxy alcohols, such as diglycerol or pentaerythritol, may also be employed as raw materials, provided there is at least one hydroxylated fatty acid radical or its equivalent present. Such raw materials can be obtained in various ways.

The simplest procedure is to eliminate part of the hydroxylated fatty acids, such as ricinoleic acid and substitute non-hydroxylated fatty acids, such as oleic acid, or if desired, an acid such as naphthenic acid. For example, one can obtain a mixed glyceride from 1 mole of ricinoleic acid, and 2 moles of naphthenic acid, or from 2 moles of ricinoleic acid and 1 mole of naphthenic acid. Similarly, naphthenic acid or oleic acid combinations can be obtained from pentaerythritol, in which one to 3 moles of ricinoleic acid appear and the remaining hydroxyls are esterified with either naphthenic acid or oleic acid.

Having obtained the acidic esters of the kind described, it is only necessary to react such esters in the customary manner with a hydroxylated basic tertiary amine which may be either a monoamine or a polyamine. It is to be noted that such amines employed as reactants do not have an aryl group directly attached to an amino nitrogen atom, except in the instance of the polyamines, where there are basic amino nitrogen radicals present.

Suitable tertiary amines which may be employed include the following: Triethanolamine, diethanolalkylamines, such as diethanol ethylamine, diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, benzyl dipropanolamine, tripentanolamine, trihexanolamine, hexyldiethanolamine, octadecyldiethanolamine, etc.

Hydroxylated tertiary polyamines may be employed, provided such amines are free from primary or secondary amine radicals, contain at least one alcoholic hydroxyl group and at least one basic amino nitrogen atom. Such polyamines could be obtained in various ways. One procedure for obtaining such amines, as well as suitable monoamines, is described in U. S. Patent No. 2,324,488, dated July 20, 1943, to De Groote and Keiser. Another procedure involves simply the oxyethylation of commercially available polyamines, such as ethylene diamine, diethylenetriamine, triethylenetetramine, tetraethylenepentamine, etc., with ethylene oxide, propylene oxide, butylene oxide, glycide, methylglycide, etc. Similarly, one may react the alkyl, aralalkyl and alicyclic derivatives of such amines in a similar fashion. For instance, such amines may be reacted with benzyl chloride or other reactants, so as to introduce one or more hydrocarbon radicals having not over 12 or 15 carbon atoms, provided there still remains an amino hydrogen atom which may be reacted with the oxyethylating agent so as to produce an alkylol group. Such polyamines must be reacted with sufficient of the oxyethylating agents to convert all of the aminohydrogen atoms into alkylol groups; and if desired, a large proportion of the oxyethylated agent can be used so as to convert the amino hydrogen atom into an alkylene oxyethylol radical having one or more ether linkages. If desired, one or more amino hydrogen atoms may be replaced by an aryl group, provided, however, that there are basic amino nitrogen atoms present. The simplest procedure, however, is simply to obtain any one of the previously mentioned amines which are commercially available, treat them in the customary manner with sufficient ethyleneoxide or the like, to convert all of the amino hydrogen atoms into alkylol radicals.

Ether type aminoalcohols may be obtained from the above mentioned amines or aminoalcohols, for example, by treating them with one or more moles of an oxyalkylating agent, such as ethylene oxide, propylene oxide, butylene oxide, glycide, methylglycide, etc. It is to be noted that comparable products are obtained by treating primary or secondary amines, other than arylamines with an olefine oxide. Primary or secondary amines which can be subjected to oxyalkylation include diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexylethanolamine, cyclohexyl propanolamine, benzylethanolamine, benzylpropanolamine, pentanolamine, hexanolamine, octylethylolamine, octadecylethanolamine, cyclohexanolethanolamine, etc.

Another procedure for producing suitable polyamino reactants, involves etherification of a polyhydroxy amine, such as triethanolamine, ethyldiethanolamine, tripropanolamine, tributanolamine, etc., by simply heating up the selected amine in presence of a small amount of a basic catalyst. This procedure for etherification of hydroxy amines, preferably hydroxy amines having at least two alcohol radicals, is well known and requires no further description. Furthermore, the polymerized amine, as obtained, may be subjected to oxyethylation, if desired, and this procedure also has been described and requires no further comment.

Since the temperature herein employed for reaction with the hydroxylated amine is sufficiently high to produce etherification under the conditions described, it becomes obvious that a polyamino product may be obtained by simply using an excess of a monoamine, for instance, triethanolamine, and continuing the reaction until there is no longer present any free triethanolamine, i. e., as all of the triethanolamine as added is either reacted to form an ester or so etherized as to form a polyamino compound.

COMPOSITION OF MATTER

*Example 1*

One pound mole of the carboxylic reactant described under the heading "Carboxylic reactant, Example 1," is mixed with 1 pound mole of triethanolamine and the mixture heated for approximately 4 to 14 hours at 160–250° C. with constant stirring. At the end of this period, the product should show the entire absence of free carboxylic radicals and uncombined triethanolamine.

COMPOSITION OF MATTER

*Example 2*

The same procedure is followed as in Example 1, except that 2 moles of triethanolamine are employed instead of 1 mole.

COMPOSITION OF MATTER

*Example 3*

The same procedure is employed as in Example 1, preceding, except that 3 moles of triethanolamine are employed instead of 1 mole.

COMPOSITION OF MATTER

*Example 4*

The same procedure is employed as in Examples 1 to 3, preceding, except that a reactant exemplified by the materials described under the heading "Carboxylic reactant, Example 2" and "Carboxylic reactant, Example 3" is employed instead of the reactant used in the previous examples.

COMPOSITION OF MATTER

*Example 5*

The same procedure is followed as in Example 4, preceding, except that the ratio of triethanolamine is increased, using, for example, 4 moles of triethanolamine for each mole of carboxylic reactant in the other instance.

COMPOSITION OF MATTER
Example 6

Triethanolamine is reacted with 1 mole of glycide so as to produce an amine of the following composition:

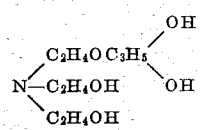

Such product is substituted for triethanolamine in the previous examples.

COMPOSITION OF MATTER
Example 7

One pound mole of an amine of the following composition:

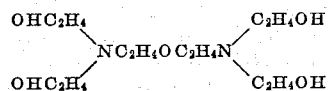

(see U. S. Patent No. 2,324,488, dated July 20, 1943, to De Groote and Keiser) is employed instead of triethanolamine in the previous examples, but using the following ratio: One mole of such polyamine is used for each free carboxylic radical present in the acidic ester reactant.

COMPOSITION OF MATTER
Example 8

The same procedure is followed as in the preceding example, except that an amine of the following composition:

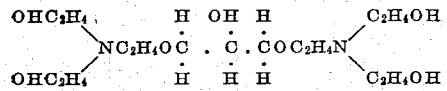

is employed. (See U. S. Patent No. 2,366,545, dated January 2, 1945, to Morris.)

COMPOSITION OF MATTER
Example 9

The same procedure is followed as in the preceding example, except that an amine of the following composition:

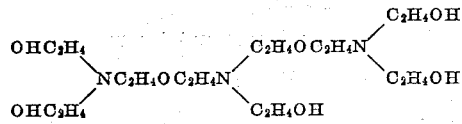

is employed. (See U. S. Patent No. 2,366,545, dated January 2, 1945, to Morris.)

COMPOSITION OF MATTER
Example 10

Diglycerol tetraricinoleate of the composition previously indicated, to wit:

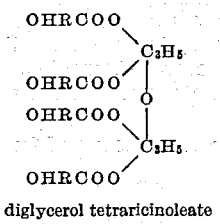

diglycerol tetraricinoleate is reacted with 1, 2, or 3 or 3½ moles of diglycollic acid in the manner previously described, and such series of diglycerol tetraricinoleate monodiglycollate and polydiglycollates are substituted for the analogs obtained from triricinolein in previous examples.

Returning to a consideration of the reactants employed in obtaining the present composition, it is to be noted that in some instances condensation polymerization can take place, insofar that both reactants are polyfunctional. This is not necessarily the case in each instance, as, for example, the product obtained by reaction between a monodiglycollate and diethylene ethanolamine. On the other hand, it is to be noted that in numerous instances there is present a plurality of unreacted carboxylic radicals, as illustrated by the various polydiglycollates previously described and the commonest type of hydroxylated amine, whether monoamine or polyamine. Thus, triethanolamine or the dimer obtained by etherization of diethanolamine, or by the complete oxyethylation of ethylene diamine, illustrates the polyfunctionality of the amino reactant. Thus, reactions of the kind previously described, particularly if continued somewhat longer than the time indicated, or at somewhat higher temperature, can produce a sub-resinous or resinous product. In many instances, such sub-resinous or balsam-like products are really the most desirable of all, but they probably do not represent any large degree of polymerization. In other words, the structural units may appear three or four times over, and in substantially every instance, the molecular weight is distinctly less than 5,000, with perhaps 3,000 as an average figure. In other words, such polymers consist largely of dimers, trimers, tetramers, pentamers, hexamers, etc., having molecular weight, by the ordinary melting point depression methods of less than 5,000. It is also obvious that polymerization may be due to this formation of new ether linkages, as well as esterification. In order to produce such sub-resinous low multiple polymers, one need only continue the time of reaction or use a somewhat increased temperature of reaction, provided the esterified aminoalcohol offers opportunity for condensation polymerization by either esterification or etherization.

In light of what has been said, it becomes obviously difficult, if not impossible, to present a formula depicting such more elaborate and more complicated aspect of the invention, i. e., a formula which would describe the low multiple polymer, as well as the monomer. However, insofar that such polymer is essentially a repetition of the structural unit with only a comparatively small change, such as one expects in condensation polymerization, it is intended that the claims hereto appended contemplate in the broadest aspect, both the monomers and the polymers.

It is our preference to employ esters wherein there is an excess of unreacted diglycollic acid radicals, compared with basic amino nitrogen atoms. By proper selection of ratio of reactants, one may, of course, have a type of ester which is alkaline in nature, that is, has more basic amino nitrogen atoms present than in esterified diglycollic carboxyl radicals. Similarly, one may have a neutral salt form where the number of basic amino nitrogen atoms is just equal to the number of free diglycollic acid radicals, and finally, one may have the acidic form, where the number of free diglycollic acid radicals is greater than the number of basic amino nitrogen radicals. Our preferred form of reagent is the one which shows either basic properties, or acidic properties, or preferably, the latter. Another type which is particularly valuable is the type in which both free carboxylic radicals and hydroxyl radicals are present. Such type is apt to appear in the polymers previously described. It is also evident that if unreacted, a carboxyl radical and the basic amino nitrogen residue may cause inner salt formation to take place, and may also be responsible for the formation of micelles, when the herein contemplated compounds are used under such conditions in which effectiveness is related to surface activity.

The preferred reagents herein contemplated represent monomers and low multiple polymers derived from triricinolein polydiglycollates and the cheapest hydroxylated tertiary amine, to wit, triethanolamine or its etherification polymers. In monomeric form the resultant of such reactions involving, for example, one mole of a triricinolein polydiglycollate and 1, 2, 3, or 4 moles of triethanolamine, or the etherized dimer thereof, is still under 1,500, and even if the monomeric unit combines so as to form several structural units, yet after allowing for elimination of water in the condensation polymerization, it becomes obvious that the low multiple condensation polymers will not exceed a molecular weight of 6,500.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found the such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described, is brought into contact with or caused to act upon the emulsion to be treated, in any of the various ways, or by any of the apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as it is concerned with demulsification of petroleum emulsions of the water-in-oil type, is concerned with the admixture of the oxyalkylated diol esters, as described, with a viscosity-reducing solvent such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier selected to give a solution or mixture particularly adaptable for proportional pumps or other measuring devices. The following examples will illustrate this aspect of our invention:

DEMULSIFIER

Example 1

| | Per cent |
|---|---|
| Composition of matter, as exemplified by Example 1 | 60 |
| Xylene | 10 |
| Cresylic acid | 10 |
| Isopropyl alcohol | 20 |

DEMULSIFIER

Example 2

| | Per cent |
|---|---|
| Composition of matter, as exemplified by Example 8 | 70 |
| Phenol | 10 |
| Denatured alcohol | 20 |

DEMULSIFIER

Example 3

| | Per cent |
|---|---|
| Composition of matter, as exemplified by Example 9 | 45 |
| Aromatic petroleum solvent | 15 |
| Isobutyl alcohol | 25 |
| Acetone | 15 |

(The above proportions represent percentage by weight.)

The results obtained with the herein contemplated compounds give results which are absolutely unexpected and unlooked-for in light of the demulsifying action of other compounds of apparently analogous structure. For instance, it is conventional practice to use fractional esters derived from triricinolein or other esters, as herein described as reactants, in combination with other dicarboxy acids, such as phthalic acid, maleic acid, malic acid, citraconic acid, azelaic acid, adipic acid, etc. On numerous emulsions the diglycollic acid derivatives have given results which are simply outstanding, in comparison with such other analogous partial esters. In other words, it appears that for some unexpected reason, the ether grouping of diglycollic acid, in combination with the carboxylic radicals and the remainder of the molecule, give some exceedingly effective adsorption property, or orientation property, which gives results so extraordinarily unusual.

EXAMPLE 1

On an oil-producing property located in the Pawnee Rock field, at or near Pawnee Rock, Kansas, the emulsion produced contained approximately 30% of emulsion and water. The emulsion broke readily at 120° F., using a demulsifier corresponding substantially to Example 4, preceding. The residual oil contained a total of $\frac{3}{10}$ percent emulsion or water. The total time involved, both in mixing and settling, was one hour. The ratio of demulsifier used on the basis of barrels of recovered oil, was 1/10,000. All told, such results represent an improvement of at least 20% over the next best available compound of the same structure, but obtained from some other dibasic acid, such as phthalic, maleic, adipic, etc., instead of diglycollic, notwithstanding the fact that this latter series of comparative tests were conducted at 40° F. higher in temperature.

EXAMPLE 2

On an oil-producing property located in the Cunningham field, at or near Cunningham, Kansas, the emulsion produced contained approximately 35% of emulsion and water. The emulsion broke readily at 120° F., using a demulsifier corresponding substantially to Example 4, preceding. The residual oil contained a total of $\frac{3}{10}$ percent emulsion or water. The total time involved, both in mixing and settling, was one hour. The ratio of demulsifier used on the basis of barrels of recovered oil, was 1 to 5,000. All told, such results represent an improvement of at least 20% over the next best available compound of the same structure, but obtained from some other dibasic acid, such as phthalic, maleic, adipic, etc., instead of diglycollic, notwithstanding the fact that this latter series of comparative tests were conducted at 20° F. higher in temperature.

EXAMPLE 3

On an oil-producing property located in the Geneseo field, at or near Geneseo, Kansas, the emulsion produced contained approximately 20% of emulsion and water. The emulsion broke readily at 70° F., using a demulsifier corresponding substantially to Example 4, preceding. The residual oil contained a total of $\frac{1}{10}$ per cent emulsion or water. The total time involved, both in mixing and settling, was 45 minutes. The ratio of demulsifier used on the basis of barrels of recovered oil, was 1–6,000. All told, such results represent an improvement of at least 25% over the next best available compound of the same structure, but obtained from some other dibasic acid, such as phthalic, maleic, adipic, etc., instead of diglycollic.

The two classes of reactants herein employed may be classified on the one hand as being acids, and on the other hand as being alcohols. For instance, when triricinolein is reacted with 1 mole of diglycollic acid, the resultant may be considered as a monocarboxy acid, whereas, if triricinolein is reacted with 2 or 3 moles of diglycollic acid, the resultant may be considered as a polycarboxy acid. Examples have been included, for instance, derivatives of diglycerol, where the resultant might have four unreacted carboxylic radicals.

The basic hydroxylated tertiary amine may represent a monohydric alcohol, or a polyhydric alcohol, for instance, diethylethanolamine, would represent a monohydric alcohol, whereas, ethyldiethanolamine, or triethanolamine, would represent a polyhydric alcohol. Other examples have been described in which more than 3 alcoholic hydroxyls could be present, for instance, the ether alcohols obtained by reacting triethanolamine with glycide.

If an alcohol is indicated by the formula $$X'(OH)_n$$

where $n$ indicates the number 2 or more, and if the diglycollic acid esters which serve as carboxy acids, and particularly polycarboxy acids, be indicated, for convenience, by the formula $$X'(COOH)_{n'}$$

such diglycollic acid derivative will result in a compound which may be indicated by the following formula:

$$YX(COOH)_{n'}$$

where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, then examination reveals that the formula might result in a combination in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

$$(Y.X)_q(OH)$$

$$(Y.X)_q(COOH)_{m'}$$

$$(OH)_{n''}(YX)_q(COOH)_{m''}$$

in which $q$ indicates a small whole number (one in the case of a monomer and probably not over 10, and usually less than 6), and $m'$ and $n'$ indicate the number 1 or more, and $m''$ and $n''$ indicate a small or moderately-sized whole number, such as 0, 1 or more, but in any event, probably a number not in excess of 10. Actually, the preferable type of reagent would be more apt to contain less than 20, and in fact, less than 10 free hydroxyl radicals. It is not necessary to remark that residual carboxyl radicals can be permitted to remain as such, or can be converted in any suitable manner into an ester. Conversion into the ester would be by means of a monohydric alcohol, such as methyl alcohol, ethyl alcohol, propyl alcohol, butyl alcohol, hexyl alcohol, etc.

For practical purposes, however, we have found that the most desirable products are obtained by combinations, in which the ratio of the alcoholic reactant to the acid is within the ratio of 3 to 1 and 1 to 5, and in which the molecular weight of the resultant product does not exceed 10,000, and is usually less than 5,000, and preferably, less than 3,000. This is particularly true, if the resultant product is soluble to a fairly definite extent, for instance, at least 5% in some solvent, such as water, alcohol, benzene, dichloroethyl ether, acetone, cresylic acid, or the like. This is simply another way of stating that it is preferable that the product be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

In recapitulating what has been said previously, the sub-resinous, semi-resinous, or resinous product herein contemplated may be indicated by the following formula:

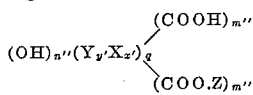

in which the characters have their previous significance, and $y'$ represents a small whole number not greater than 3, and $x'$ represents a small whole number not greater than 5; $q$ is a small whole number less than 10, and preferably 1 to 5; Z represents a hydrogen ion equivalent, such as a hydrogen atom, or an organic radical derived from a monohydric alcohol.

Sub-resinous materials having the repetitious unit appearing 3 to 10 times and having a plurality of free carboxyl radicals, or free hydroxyl radicals, or both, are well known in a variety of forms and find practical application in demulsification of crude oil emulsions. Generally speaking, the molecular weight of such sub-resinous materials, regardless of class, is less than 10,000 and is more apt to be in a range of 3 to 5,000 as an upper limit.

A more elaborate description of this type of material appears in numerous patents concerned with demulsification of crude oil emulsions, and reference is made to such patents for a more elaborate description: U. S. Patents 2,231,755, dated February 11, 1941, to De Groote and Keiser and Blair; 2,231,756, dated February 11, 1941, to De Groote, Keiser and Blair; 2,241,011, dated May 6, 1941, to De Groote and Keiser; 2,226,115, dated December 24, 1940, to De Groote and Keiser and Wirtel; 2,226,116, dated December 24, 1940, to De Groote and Keiser; 2,226,120, dated December 24, 1940, to De Groote and Keiser and Wirtel.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts and the anhydro base, as well as the hydrated base, since both obviously are present when an aqueous system is being subjected to the reagent, or when the reagent is used as a water solution or dispersion. (In an aqueous solution of the amine, the anhydro base, R—NH₂, the hydrated base, R—NH₃—OH, and the two ions are all present." Richter, s. v., page 252.)

Attention is directed to our co-pending applications Serial Nos. 604,993, 604,994, 604,995, 604,996, 604,997, 604,998, 605,000, 605,001 and 605,002, filed July 13, 1945, all of which are related to the present application, in that such co-pending applications are concerned, among other things, with the breaking of oil field emulsions by means of demulsifiers containing a diglycollic acid radical.

Attention is directed to the fact that blown oils derived from higher fatty acids or higher fatty acid glycerides, and particularly blown castor oil, may be employed as a source of a detergent-forming monocarboxy acid acyl radical, or acyloxy radical, in the preparation of the herein contemplated compounds. In innumerable instances, the replacement of castor oil or an analogous ester or ricinoleic acid by the drastically-oxidized or blown product, gives a compound which is particularly valuable as a demulsifying agent for petroleum emulsions. This applies with equal force and effect to blown dehydrated castor oil and its analogs in the form of the corresponding acids or other esters.

The new chemical products or compounds herein described forming the subject-matter of our divisional application Serial No. 707,984, filed November 5, 1946.

Having thus described our invention, what we claim as new and desire to obtain by Letters Patent is:

1. A process for breaking petroleum emulsions of the water-in-oil type, characterized by subjecting the emulsion to the action of the esterification product of (A) An acidic partial ester containing (a) at least one polyhydric alcohol radical, (b) at least one diglycollic acid radical, and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and (B) A basic hydroxylated tertiary amine.

2. The process of claim 1, wherein said acidic partial ester contains only one polyhydroxy alcohol radical.

3. The process of claim 1, wherein said acidic partial ester contains only one polyhydroxy alcohol radical and each of said detergent-forming monocarboxy acyloxy radicals is an acyloxy radical derived from a fatty acid having 18 carbon atoms.

4. The process of claim 1, wherein said acidic partial ester contains only one polyhydroxy alcohol radical, and each of said detergent-forming monocarboxy acyloxy radicals is an acyloxy radical derived from a hydroxylated fatty acid having 18 carbon atoms.

5. The process of claim 1, wherein said acidic partial ester contains only one polyhydroxy alcohol radical, and all detergent-forming monocarboxy acyl radicals are ricinoleyl radicals.

6. The process of claim 1, wherein said acidic partial ester contains only one polyhydroxy alcohol radical, all detergent-forming monocarboxy acyl radicals are ricinoleyl radicals, and the tertiary amine is an alkanol monoamine.

7. The process of claim 1, wherein said acidic partial ester contains only one polyhydroxy alcohol radical, all detergent-forming monocarboxy acyl radicals are ricinoleyl radicals, and wherein the tertiary amine is triethanolamine.

8. A process for breaking petroleum emulsions of the water-in-oil type, characterized by subjecting the emulsion to the action of the esterification product of a triricinolein monodiglycollate and triethanolamine.

9. A process for breaking petroleum emulsions of the water-in-oil type, characterized by subjecting the emulsion to the action of the esterification product of a triricinolein di-diglycollate and triethanolamine.

10. A process for breaking petroleum emulsions of the water-in-oil type, characterized by subjecting the emulsion to the action of the esterification product of a triricinolein tri-diglycollate and triethanolamine.

MELVIN DE GROOTE.
ARTHUR F. WIRTEL.

REFERENCES CITED

The following references are of record in the file of this patent:

UNITED STATES PATENTS

| Number | Name | Date |
|---|---|---|
| 2,127,905 | De Groote | Aug. 23, 1938 |
| 2,372,797 | Segessemann | Apr. 3, 1945 |
| 2,385,969 | De Groote et al. | Oct. 2, 1945 |